US012619712B2

(12) United States Patent
Jungwirth

(10) Patent No.: US 12,619,712 B2
(45) Date of Patent: May 5, 2026

(54) SECURE COMPUTER ARCHITECTURE USING STATE MACHINES

(71) Applicant: U.S. Army DEVCOM Army Research Laboratory, Adelphi, MD (US)

(72) Inventor: Patrick W. Jungwirth, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 308 days.

(21) Appl. No.: 17/675,254

(22) Filed: Feb. 18, 2022

(65) Prior Publication Data

US 2022/0269778 A1 Aug. 25, 2022

Related U.S. Application Data

(60) Provisional application No. 63/152,083, filed on Feb. 22, 2021.

(51) Int. Cl.
| | |
|---|---|
| *G06F 21/54* | (2013.01) |
| *G06F 9/30* | (2018.01) |
| *G06F 9/38* | (2018.01) |
| *G06F 9/448* | (2018.01) |
| *G06F 9/48* | (2006.01) |
| *G06F 21/55* | (2013.01) |

(52) U.S. Cl.
CPC ............ *G06F 21/54* (2013.01); *G06F 9/3004* (2013.01); *G06F 9/30079* (2013.01); *G06F 9/3861* (2013.01); *G06F 9/4498* (2018.02); *G06F 9/4812* (2013.01); *G06F 21/554* (2013.01)

(58) Field of Classification Search
None
See application file for complete search history.

(56) References Cited

U.S. PATENT DOCUMENTS

| | | |
|---|---|---|
| 9,122,610 B2 | 9/2015 | Jungwirth et al. |
| 10,572,687 B2 | 2/2020 | Jungwirth |

| | | | |
|---|---|---|---|
| 2007/0079015 A1* | 4/2007 | Royer, Jr. | ............. G06F 3/0661 |
| | | | 710/5 |
| 2008/0196102 A1* | 8/2008 | Roesch | ................... G06F 21/55 |
| | | | 726/23 |
| 2017/0286278 A1* | 10/2017 | Thomas | .................. G06F 21/52 |
| 2018/0329956 A1* | 11/2018 | Mittal | ................... G06F 9/3867 |
| 2019/0370110 A1* | 12/2019 | Leyrer | ...................... G06F 9/52 |
| 2021/0119878 A1* | 4/2021 | Loftus | ................. H04L 43/0823 |
| 2021/0374767 A1* | 12/2021 | Kurian | ................... G06Q 10/10 |

OTHER PUBLICATIONS

P. Jungwirth, and J. Ross: "Security Tag Fields and Control Flow Management," IEEE SouthEastCon 2019, Huntsville, AL, Apr. 2019.
Jungwirth, et al.: "Cyber Defense Through Hardware Security"; Proc. SPIE 10652, Disruptive Technologies in Information Sciences, 106520P (May 9, 2018); doi: 10.1117/12.2302805.
Jungwirth, et al.: "Cybersecurity and OSFA Architecture"; NCS'17, Jun. 7-8, 2017, Huntsville, AL, USA.
Jungwirth, et al.: "Hardware Security Kernel for Cyber Defense"; US Army Research Lab Computational and Information Sciences Directorate; US Army Combat Capabilities Development Command Aviation & Missile Center, Redstone Arsenal, AL 35898; Survivability/Lethality Analysis Directorate, Aberdeen Proving Ground, MD, USA.
Jungwirth, et al.: "OS Friendly Microprocessor Architecture"; ARL-SR-0370; Apr. 2017.
Jungwirth, et al.: "Rootkits and the OS Friendly Microprocessor Architecture": Proc. SPIE 10185, Cyber Sensing 2017, 1018503 (May 1, 2017); doi: 10.1117/12.2258235.
Jungwirth, et al.: "Secure Computing Architecture: A Direction for the Future—The OS Friendly Microprocessor Architecture"; Conference Paper Sep. 2017.
P. Jungwirth, et al.: "Security Tag Computation and Propagation in OSFA," SPIE Defense + Security, Orlando, FL, Apr. 2018.

* cited by examiner

*Primary Examiner* — Brian Whipple
(74) *Attorney, Agent, or Firm* — Christos S. Kyriakou

(57) ABSTRACT

A computing architecture using at least one state machine to apply security rules to an execution pipeline of a computing device (e.g., microprocessor) and generate error notifications (e.g., hardware exceptions) when content within the execution pipeline impacts computer security.

20 Claims, 19 Drawing Sheets

1300

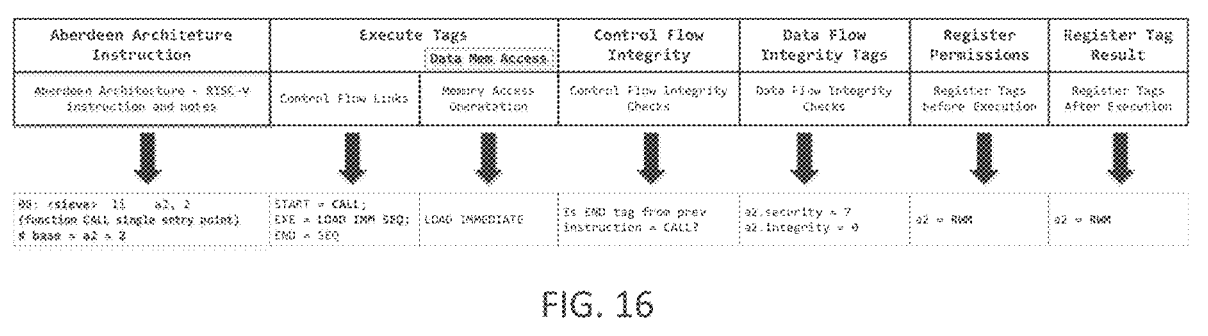

| Aberdeen Architecture Instruction | Execute Tags | | Control Flow Integrity | Data Flow Integrity Tags | Register Permissions | Register Tag Result |
|---|---|---|---|---|---|---|
| | | Data Mem Access | | | | |
| Aberdeen Architecture - RISC-V instruction and notes | Control Flow Links | Memory Access Orientation | Control Flow Integrity Checks | Data Flow Integrity Checks | Register Tags before Execution | Register Tags After Execution |
| 28: <sieve> li    a2, 2 (function CALL single entry point) # base = a2 = 2 | START = CALL; EXE = LOAD IMM SEQ; END = SEQ | LOAD IMMEDIATE | Is END tag from prev instruction = CALL? | a2.security = 7 a2.integrity = 0 | a2 = RWX | a2 = RWX |

FIG. 16

Function CALL Single Entry Point

| Aberdeen Architecture Instruction | Execute Tags | | Control Flow Integrity | Data Flow Integrity Tags | Register Permissions | Register Tag Result |
|---|---|---|---|---|---|---|
| | | Data Mem Access | | | | |
| 00: <sieve> li a2, 2<br>(function CALL single entry point)<br># base = a2 = 2 | START = CALL;<br>EXE = LOAD IMM SEQ;<br>END = SEQ | LOAD IMMEDIATE | Is END tag from prev instruction = CALL? | a2.security = 7<br>a2.integrity = 0 | a2 = RWM | a2 = RWM |
| 06: li a1, 0x300<br># buffer length = 0x300 | START = SEQ;<br>EXE = LOAD IMM SEQ;<br>END = SEQ | LOAD IMMEDIATE | Is END tag from prev instruction = SEQ? | a1.security = 7<br>a1.integrity = 0 | a1 = READ | a1 = READ |
| 00: li (a0, 0x 00, 0x)<br># bottom of buffer<br># a0 = base level | START = SEQ<br>EXE = SEQ<br>END = SEQ | | Is END tag from prev instruction = SEQ? | | a0 = RWM | a0 = ARRAY POINTER Portion Inverted |
| 16: li a7, 1<br># a7 = 1 | START = SEQ<br>EXE = LOAD IMM SEQ<br>END = SEQ | LOAD IMMEDIATE | Is END tag from prev instruction = SEQ? | a7.security = 7<br>a7.integrity = 0 | a7 = READ | a7 = READ |
| 1A: li a6, 0x63<br># LAST = R^2 - 1 = 100 - 1 | START = SEQ<br>EXE = LOAD IMM SEQ<br>END = SEQ | LOAD IMMEDIATE | Is END tag from prev instruction = SEQ? | a6.security = 7<br>a6.integrity = 0 | a6 = READ | a6 = READ |
| 18: li t1, 0x0A<br># t1 = 0 = 10 | START = SEQ<br>EXE = LOAD IMM SEQ<br>END = SEQ | LOAD IMMEDIATE | Is END tag from prev instruction = SEQ? | t1.security = 7<br>t1.integrity = 0 | t1 = READ | t1 = READ |
| 1C: j 28 <t1><br># jump to <t1> | START = SEQ<br>EXE = JMP<br>END = JMP | NONE | Is END tag from prev instruction = SEQ?<br>Is Jump Destination Valid? | | N/A | N/A |
| 20: <t1> addi a2, a2, 1<br># a2 = base = base +1 | START = BR;<br>EXE = SEQ;<br>END = SEQ | NONE | Is END tag from prev instruction = BR? | a2.dfi = a2.dfi = (7, 0) | a2 = RWM | a2 = RWM |
| 24: beq a2, t1, 78 <t2><br># if base = 0 then <t2> done | START = SEQ;<br>EXE = BR;<br>END = SEQ|BR | NONE | Is END tag from prev instruction = SEQ?<br>Is branch destination address or sequential next instruction valid? | a2 = READ<br>t1 = READ | N/A |
| 28: <t1> scat a5, a2 ,0x5<br># a5 = word offset | START = SEQ|BR|JMP;<br>EXE = SEQ;<br>END = SEQ | NONE | Is END tag from prev instruction=SEQ|BR|JMP? | a5.dfi = a2.dfi = (7, 0) | a5 = RWM<br>a2 = RWM | a5 = RWM |
| 2C: slli a5, a5, 0x2<br># a5 = byte offset (note 1) | START = SEQ;<br>EXE = SEQ<br>END = SEQ | NONE | Is END tag from prev instruction = SEQ? | a5.dfi = a5.dfi = (7, 0) | a5 = RWM | a5 = RWM |

FIG. 17A

| Aberdeen Architecture Instruction | Execute Tags (Data Mem Access) | Control Flow Integrity | Data Flow Integrity Tags | Register Permissions | Register Tag Result |
|---|---|---|---|---|---|
| 30: add a5, a6, a5<br># a5 = pb[0] + byte offset | START = SEQ;<br>EXE = SEQ;<br>END = SEQ | none | Is SEQUENTIAL Execution valid? | a5.dfi = a6.dfi = (7, 0) | a5 = RWM<br>a6 = Array pointer | a5 = Array Pointer |
| 34: lw a5, 0(a5)<br># a5 = LW(addr = a5) | START = SEQ;<br>EXE = LOAD;<br>END = SEQ | Is EXE tag = LOAD, PID valid for Mem Page, SEQUENTIAL Exe valid? | a5 = pointer, and a5 = dfi(Mem(a5 + 0)) = (7, 0 ) | a5 = Array Pointer | a5=tags.Mem(a5+0)<br>a5 is not a pointer |
| 38: sra a5, a5, a2<br># a5 = a5 >> a2 (note 2) | START = SEQ;<br>EXE = SEQ;<br>END = SEQ | NONE | Is END tag from prev instruction = SEQ? | a5.dfi = a5.dfi ◊ a2.dfi = (7, 0) | a5 = RWM<br>a2 = RWM | a5 = RWM |
| 3c: andi a3, a5, 1<br># a5 = pb[word, bit number] | START = SEQ;<br>EXE = SEQ;<br>END = SEQ | NONE | Is END tag from prev instruction = SEQ? | a5.dfi = a5.dfi = (7, 0) | a5 = RWM | a5 = RWM |
| 40: beqz a5, 2c <t3><br># if a5 = bit = 0 the <t3> | START= SEQ;<br>EXE = BR;<br>END = SEQ\|BR | NONE | Is END tag from prev instruction = SEQ? Is Branch destination address or sequential next instruction valid? | a5 = RWM | N/A |
| 44: slli a3, a2, 0x2<br># a3 = cnt = base + base | START = SEQ;<br>EXE = SEQ;<br>END = SEQ | NONE | Is END tag from prev instruction = SEQ? | a3.dfi = a2.dfi = (7, 0) | a3 = RWM<br>a2 = RWM | a3 = RWM |
| 48: slai a3, a3, 0x5<br># a3 = word offset from a3 | START = SEQ\|BR;<br>EXE = SEQ;<br>END = SEQ | NONE | Is END tag from prev instruction = SEQ? | a3.dfi = a3.dfi = (7, 0) | a3 = RWM<br>a3 = RWM | a3 = RWM |
| 4c: slli a5, a5, 0x2<br># a5 = byte offset | START = SEQ;<br>EXE = SEQ;<br>END = SEQ | NONE | Is END tag from prev instruction = SEQ? | a5.dfi = a5.dfi = (7, 0) | a5 = RWM | a5 = RWM |
| 50: add a5, a0, a5<br># a5 = pb[0] + byte offset | START = SEQ;<br>EXE = SEQ;<br>END = SEQ | NONE | Is END tag from prev instruction = SEQ? | a5.dfi = a5.dfi ◊ a0.dfi = (7, 0) | a5 = RWM<br>a0 = Array Pointer | a5 = Array Pointer |
| 54: lw a1, 0(a5)<br># a1 = LW(addr = a5 + 0) | START = SEQ;<br>EXE = LOAD MEM;<br>END = SEQ | Is EXE tag = LOAD, PID valid for Mem Page, a5 = pointer, and SEQUENTIAL Exe valid? | a1 = RWM<br>a5 = ARRAY POINTER | a1 = ReadMem(0+a5)<br>a5 = Array Pointer |

SECURE COMPUTER ARCHITECTURE USING STATE MACHINES

RELATED APPLICATION

This application claims benefit to U.S. Provisional Patent Application Ser. No. 63/152,083 filed 22 Feb. 2021 entitled "Aberdeen Architecture High Assurance, Hardware State Machine Microprocessor," which is hereby incorporated herein in its entirety.

GOVERNMENT INTEREST

The invention described herein may be manufactured, used and licensed by or for the U.S. Government.

BACKGROUND

Field

Embodiments of the present invention generally relate to computing devices and, more specifically, to secure computer architectures using state machines.

Description of the Related Art

In a traditional computer, an operating system manages computer system resources. Current microprocessors execute or run instructions without any verification or authentication. The computer treats all instructions in the same manner, i.e., there is no difference between safe instructions, coding errors, and malicious instructions. The principle of complete mediation is a computer security principle that has not been fulfilled in current microprocessors. Complete mediation requires verification of access rights and authority for every operation before the operation is executed (completed). Current microprocessors mix objects with different security attributes into the same class ignoring computer separation and isolation principles. Current microprocessor do not use information flow principles for computer security. Current microprocessors do not utilize a hardware-software co-design approach to take full advantage of separation and isolation security principles.

Information leakage is a common problem for current computing environments. Within a microprocessor, there are many information flows, including: instruction flow, memory access flow, control flow, and data flow. Malicious software may attack any of these information flows and unscrupulously leak information.

Therefore, there is a need in the art for improved computing architecture for microprocessors to enhance security and mitigate information leakage.

SUMMARY

Embodiments of the present invention generally comprise a computing architecture that uses at least one state machine to monitor information flow within a computing device and enforce information flow integrity policies based upon content and properties of the information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 16 shows an example line of code illustrating security tag fields before and after execution in accordance with at least one embodiment of the invention; and FIGS. 17A, 17B, and 17C show an example program running on a microprocessor operating in accordance with one or more embodiments of the invention.

DETAILED DESCRIPTION

Figure 1:
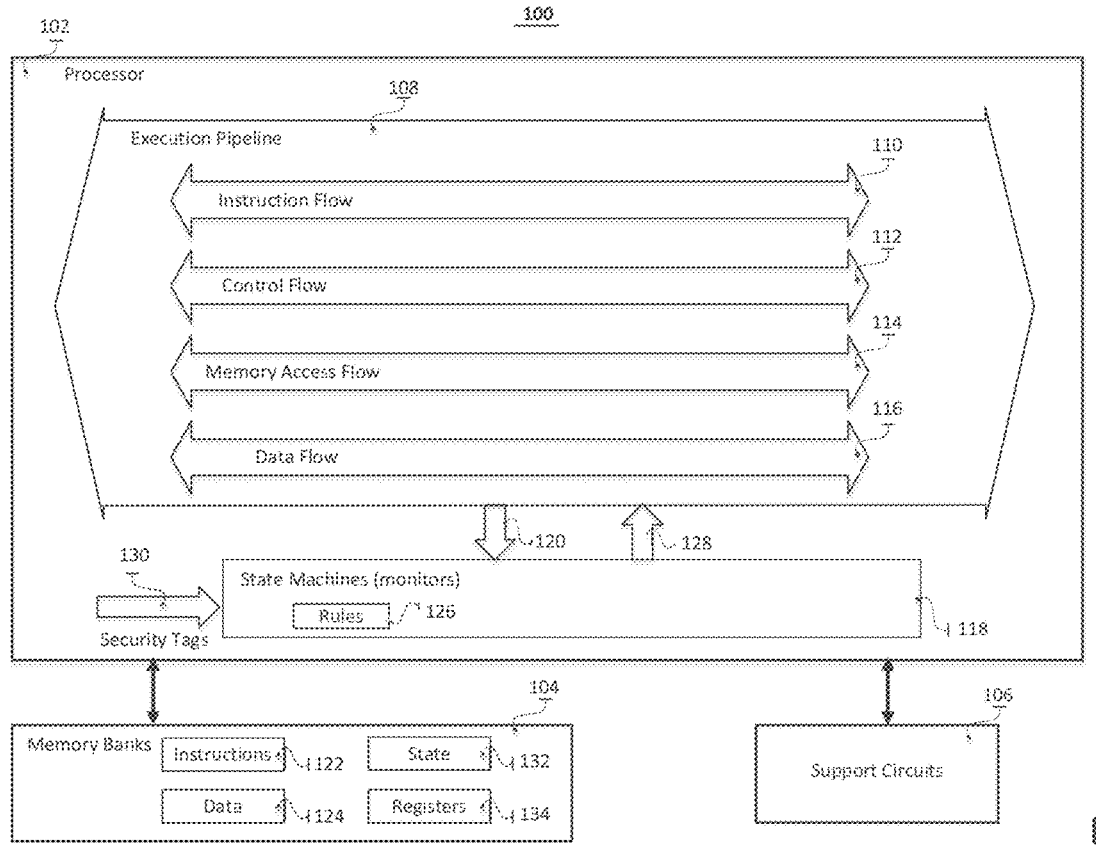
FIG. 1 depicts block diagram of a computer having a computer architecture using state machines in accordance with at least one embodiment of the invention.

Embodiments of the present invention comprise a computing architecture using at least one state machine to apply security rules to an execution pipeline of a computing device (e.g., microprocessor) and generate error notifications (e.g., hardware exceptions) when content within the execution pipeline impacts computer security. In one embodiment, the execution pipeline generally comprises at least one information flow and, more specifically, at least four information flows, namely: instruction flow, control flow, memory access flow, and data flow. The computing architecture provides at least one state machine to monitor one or more of these execution pipeline information flows. The state machine(s) apply a set of security protocol rules to the information flows and, if a state machine identifies content within a flow that violates a rule, an error notification is set (e.g., a hardware exception). The exception may be handled by the computing device based on the severity level of the rule violation or violations, e.g., multiple rule violations result in a shutdown of the offending application or a single data violation may result in a re-execution of the code.

Embodiments of the present invention incorporate several protection mechanisms that re-inforce each individual protection mechanism. The protection mechanisms follow a hardware-software co-design approach. For example, control flow integrity only provides protection for program execution along a known control flow path. Memory and stack operations are not taken into account in a control flow graph. Memory access flow protections track stack and memory operations providing protections where control flow integrity lacks protection. Data flow determines the current execution path on a control flow integrity graph. Data flow can also drive memory and stack operations. To re-inforce control flow integrity, data flow integrity is tracked through instruction execution, and memory operations. Additional control flow protections are provided by code block structures that limit code entry and exit points. For example, gadget based attacks are required to jump into a block of code which ends with a return from subroutine. By limiting the code entry and exit points, gadget attack vectors are significantly reduced to completely prevented.

Embodiments of the present invention provide multiple levels of security tag fields for the protection mechanisms. The security tag fields are the protocol security scripts for the state machine security monitors. The security tag fields allow the security and integrity properties to be completely tracked, verified and authenticated during program execution. The present invention completely virtualizes the execution pipeline in hardware.

Embodiments of the present invention define multiple memory types (executable, stack, memory, input/output, arrays, etc.). The memory type properties limit the operations allowed and enforce computer security principles of least privilege, privilege separation, and complete mediation. For example, executable memory can only be loaded and executed. Only stack operations are allowed for stack memory type. Further isolation is provided by using multiple stacks for programs and data. Mixing executable information and data on the same stack violates Saltzer and Schroeder's security principles.

FIG. 1 depicts block diagram of a computer 100 having a computer architecture using state machines in accordance with at least one embodiment of the invention. The computer 100 comprises at least one processor 102, a memory 104 and support circuits 106. The processor 102 may include one or more processors as part of the processor(s) 102, any of which, either individually or in combination, are capable of performing the operations described herein. For example, the processor(s) 102 may comprise a computing device comprising, one or more or any combination of, microprocessors, microcontrollers, central processing units (CPUs), graphics processing units (GPUs), digital signal processors (DSPs), field programmable gate arrays (FPGAs), application specific integrated circuits (ASICs), or the like.

The support circuits 106 may comprise circuits and devices that support the functionality of the processor(s) 102. The support circuits 106 may comprise, one or more or any combination of: clock circuits, communications circuits, cache memory, direct memory access (DMA) controllers, power supplies, interface circuits for the various sensors, actuators, and communications circuits, and the like.

Memory 104 is an example of one or more non-transitory computer readable media capable of storing instructions which, when executed by any of the one or more processor(s) 102, cause the processor(s) 102 to perform any one or more operations. The memory 104 may store instructions 122 in the form of an operating system and one or more software applications, programs, as well as data 124. In various implementations, the memory 104 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

The processor 102 comprises an execution pipeline 108 that operates to execute instructions 122 stored in memory 104 using the data 124. The Execution pipeline 108 comprises one or more information flows. In one embodiment, there are four information flows, namely: an instruction flow 110, a control flow 112, a memory access flow 114 and a data flow 116. At least one state machine 118 is coupled via paths 120 and 128 to at least one flow 110, 112, 114 and/or 116 to monitor activity via path 120 and control activity via path 128 within the flow(s). The state machine 118 applies one or more security rules 126 to the activity in a monitored flow. If some activity (e.g., instruction) does not fulfill the rules 126, the processor may stop the instruction from being completed. Security tag fields 130 contain parameters for the rules 126 used by the state machine monitor(s) 118. The action taken by the processor may be commensurate with the severity of the detected fault. For example, a single data flow error may be a minor data error with low severity such that the processor will merely re-executes the portion of code where the error occurred. However, if multiple rules are broken across multiple flows, a severe error would be indicated and the processor may stop all execution and close the application causing the errors.

In one embodiment, the state machine(s) 118 are implemented in hardware and errors are flagged as hardware exceptions. The state machine(s) operate at security level 0, one level below the instruction level (i.e., security level 1) such that complete mediation is accomplished, i.e., only authorized information will flow through the execution pipeline. The processor 102 handles the hardware exceptions to decide the severity of the error and the resulting action to be taken. The architecture may support either complex instruction set computing (CISC), reduced instruction set computing (RISC) or other architectures; however, for expediency, the following disclosure focuses upon RISC-V instruction set architecture.

The state machine(s) 118 use a two-level tagged architecture to simplify the security policy. A 'global' policy establishes the sandbox (or fence) limit for each process. A 'local' policy sets stricter limits for individual instructions. Exceeding the 'global' bounds could potentially interfere with another process. Exceeding a 'local' bound would normally only affect the process itself.

Figure 2:
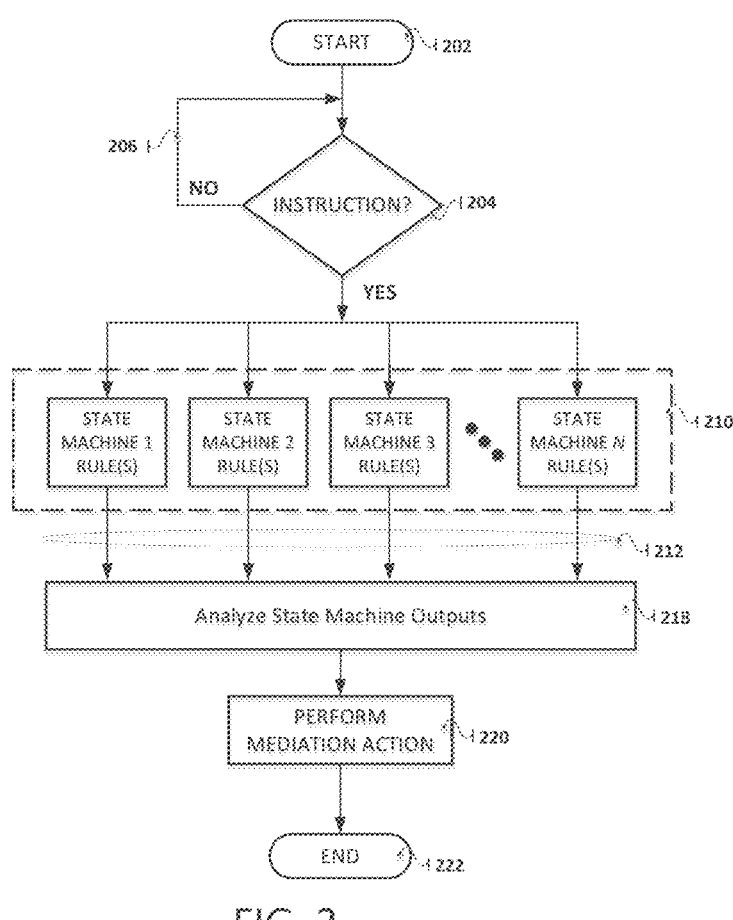
FIG. 2 depicts a high-level flow diagram of a method of operation of the computer in accordance with at least one embodiment of the invention.

FIG. 2 depicts a high-level flow diagram of a method 200 of operation of the computer 100 in accordance with at least one embodiment of the invention. At 202, the method 200 begins and proceeds to 204 where the method 200 queries whether there is an instruction on the execution pipeline. If no instruction, the method 200 loops (i.e., waits) for an instruction. Upon an instruction arriving to be analyzed, the method 200 continues to 210 where appropriate state machine(s) is/are selected from a plurality of state machines. The type of state machine to use depends upon the type of instruction. Although, an actual selection may be made and cause the operation of a particular state machine, more generally, the state machines continuously monitor the execution pipeline in parallel and self-select by automatically operating on particular aspects of the information flow related to the instruction. In one embodiment, state machine monitors include, but are not limited to, an instruction execution monitor (IEM), a memory page monitor (MPM), a control flow monitor (CFM), a data flow monitor (DFM), an exception monitor (EM), a stack monitor (SM), an interrupt monitor (IM) and combinations thereof. The IEM ensures that the instruction is being correctly handled within the pipeline. The MPM ensures that no memory pages are being anomalously accessed. The CFM and DFM respectively monitor the flow of instructions and data to ensure no anomalous activities are occurring. The EM handles exceptions that may arise from any of the monitors to indicate an error and decides what action will be taken in view of the exception. The SM and IM respectively monitor the pipeline for stack and interrupt errors.

At 210, the selected state machines applies its rules to the instruction or its related information (i.e., timing, data, memory access, flow, etc. If an exception arises, in 212, the method 200 stores the exception in a register. In 210, all monitors in parallel continuously and simultaneously monitor the pipeline error state. State machine(s) may be analyzed serially, at the cost of slower processing.

At 218, the exception monitor analyses state machine(s) output in 212 (saved in the register). Depending upon the type and number of exceptions, at 220, the method 200 performs an action. Actions may vary depending on the severity and number of exceptions. The method ends at 222.

Figure 3:
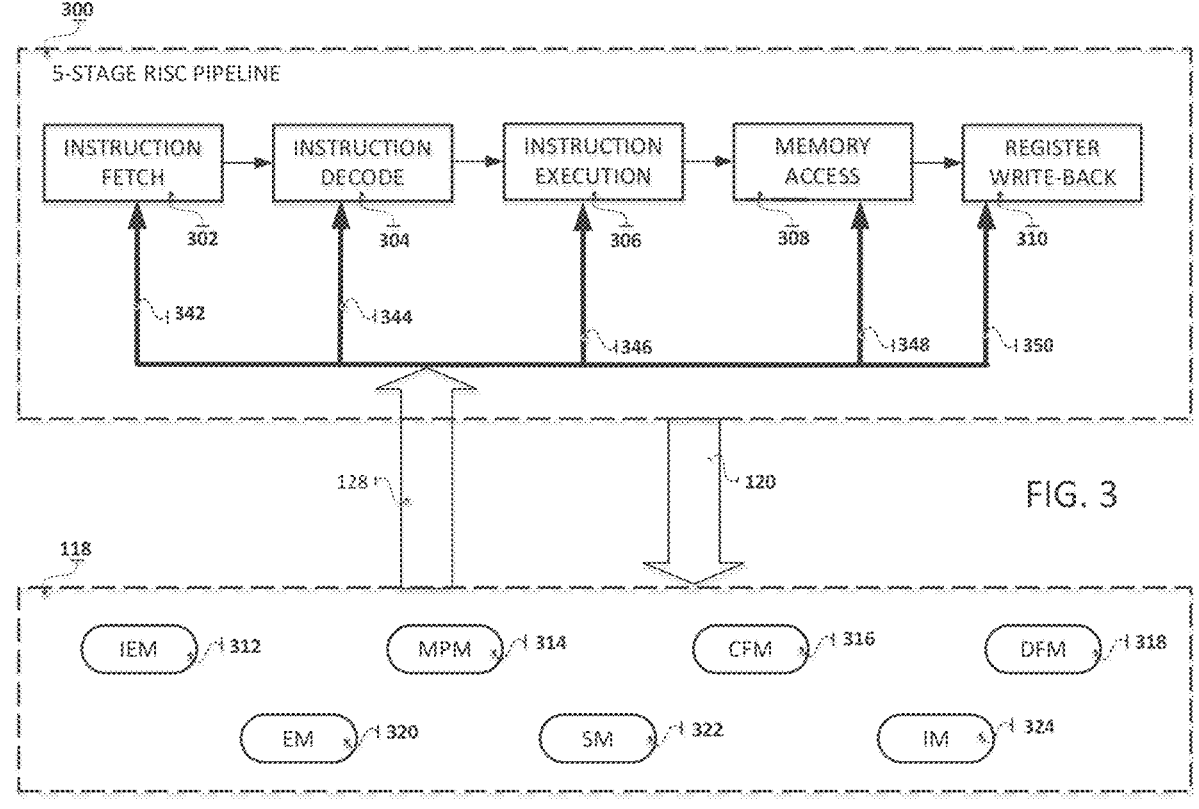
FIG. 3 depicts a block diagram of RISC execution pipeline coupled with state machines in accordance with at least one embodiment of the invention.

FIG. 3 depicts a block diagram of a RISC execution pipeline 300 coupled with state machines in accordance with at least one embodiment of the invention. In the RISC-V embodiment, the pipeline 300 comprises 5 stages, namely: instruction fetch (IF) 302, Instruction Decode (ID) 304, Instruction Execute (EXE) 306, Memory Access (MA) 308 and Register Writeback (WB) 310. In one embodiment state machine 118 comprises a plurality of state machine monitors, namely: an instruction execution monitor (IEM) 312, a memory page monitor (MPM) 314, a control flow monitor (CFM) 316, a data flow monitor (DFM) 318, an exception monitor (EM) 320, a stack monitor (SM) 322 and an interrupt monitor (IM) 324 which together monitor information flows (110, 112, 114, and 116) through path 120, at security level 0, as described with respect to FIG. 1. Control outputs 342, 344, 346, 348, and 350 manages via path 128 the pipeline stages 302, 304, 306, 308, and 310, respectively.

The state machines 118 manage objects (instructions, data memory pages and memory operations) by classes. The RISC-V architecture utilizes four instruction classes: (1) arithmetic/logic/state machine call sequential, (2) load/store sequential, (3) conditional branch, and (4) jump. Each instruction class has a set of security properties enforced by the state machine monitors. The instruction execution state machine monitor provides near to full complete mediation for instruction execution.

Generally, there are several memory page classes. Each memory page class has a set of security properties enforced by the state machine monitors. The memory page monitor (MPM) enforces security properties for several different memory page types. For example, the I/O_Page_Mem class provides for page level input and output operations. No data operations may be performed on an I/O_Page_Mem type. This restriction enforces least privilege, privilege separation, and complete mediation for I/O. Data and math operations are restricted to "data" contained in a memory page type=Data_Page_Mem class. There are privileged state machine call conversion instructions provided to convert memory pages between I/O_Page_Mem and Data_Page_Mem types.

Data for a dynamically linked library (DLL) is contained in a page memory type DLL_Data. A privileged state machine call instruction is required to convert DLL_Data_Page to DLL_Call_Page. DLL_Call_Page can only be accessed by a DLL. The returning DLL calls another privileged state machine instruction to convert the memory page back to DLL_Data_Page. The DLL data memory page types help enforce least privilege and privilege separation.

The memory page monitor (MPM) provides complete mediation for load and store memory operations. The stack monitor (SM) provides complete mediation for all stack operations. The architecture uses multiple stacks to provide least privilege and privilege separation for different stack types. For example, return addresses and call arguments are not placed on the same stack.

The architecture provides complete mediation for instruction execution and memory operations including control flow and data flow monitoring. Control flow monitoring verifies that program execution follows its control flow graph. Data flow monitoring verifies information flow during program execution. Being at security level 0, the trusted computing base is completely implemented in hardware and completely isolated from software.

Figure 4:
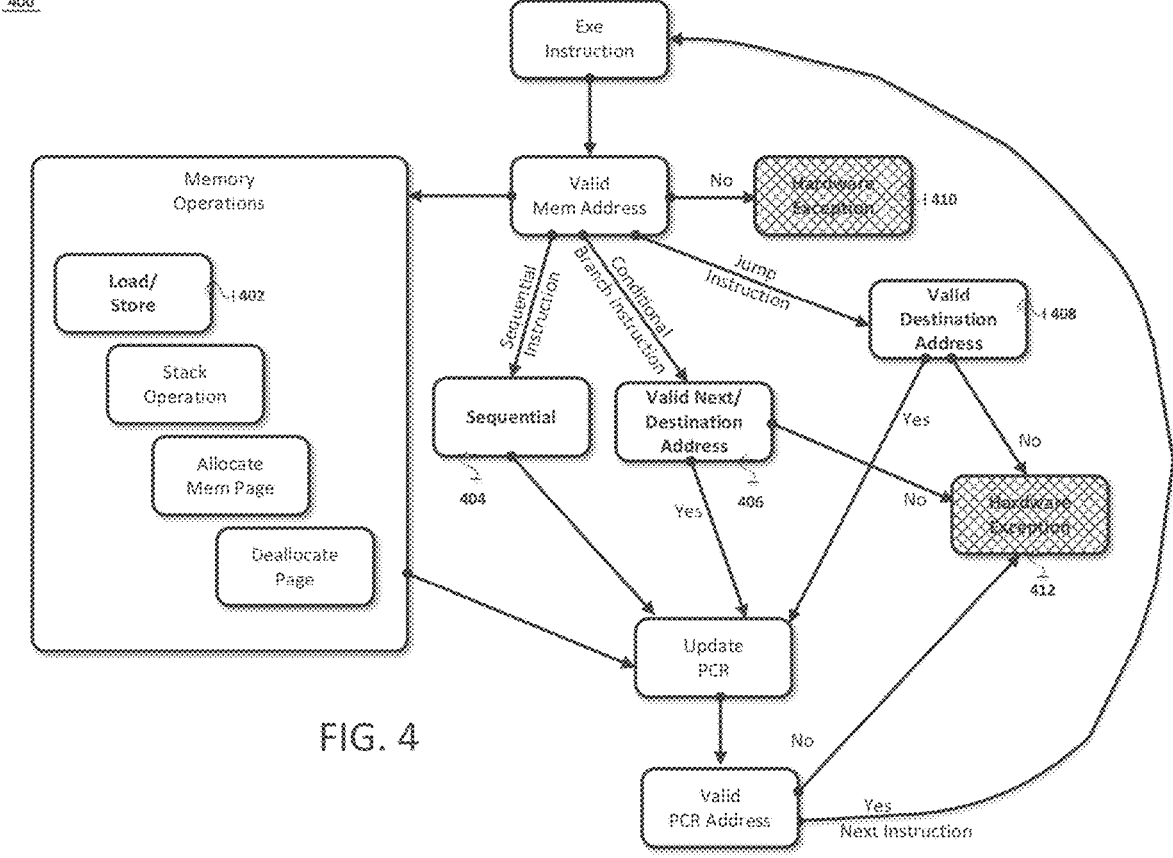
FIG. 4 is a state diagram of an exemplary embodiment of an instruction execution state machine.

FIG. 4 is a state diagram 400 of an exemplary embodiment of an instruction execution state machine. The four classes of instruction execution control flows are shown at load/store 402, sequential 404, conditional branch 406 and jump 408. If incorrect memory addresses are evident during any of these flows, the state machine generates a hardware exception 410, 412.

Figure 5:
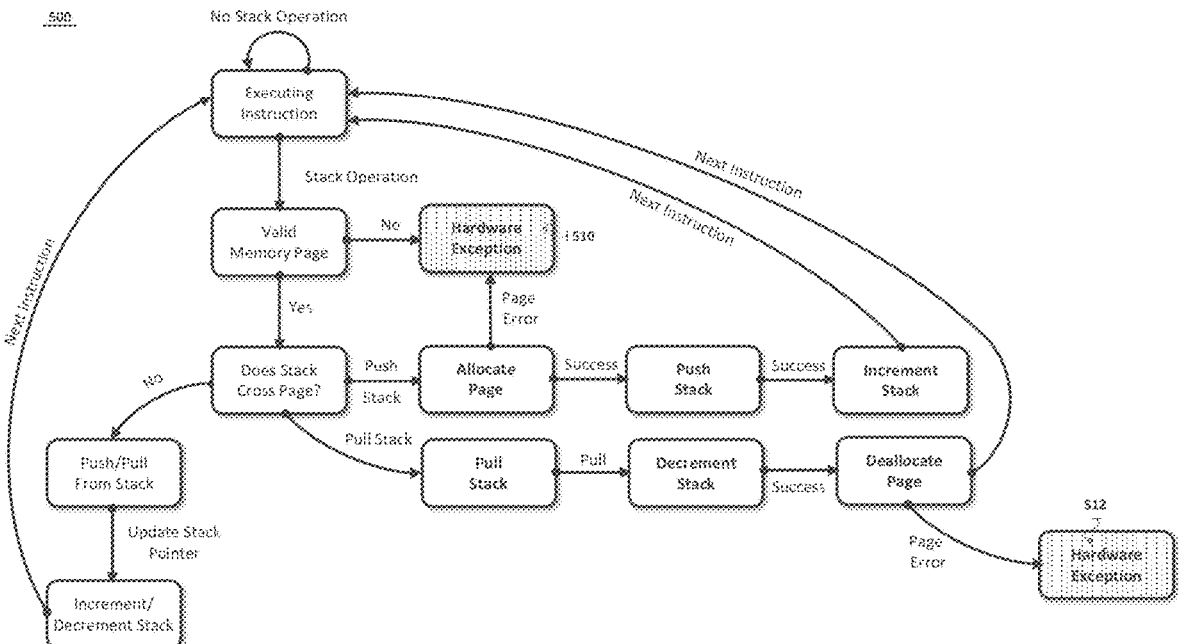
FIG. 5 is a state diagram of an exemplary embodiment of a stack monitoring state machine.

FIG. 5 is a state diagram 500 of an exemplary embodiment of a stack monitoring state machine. The state machine monitors all stack operations that may occur upon the execution of a typical stack instruction. If the instruction attempts to access an incorrect page, the state machine generates a hardware exception 510, 512.

Figure 6:
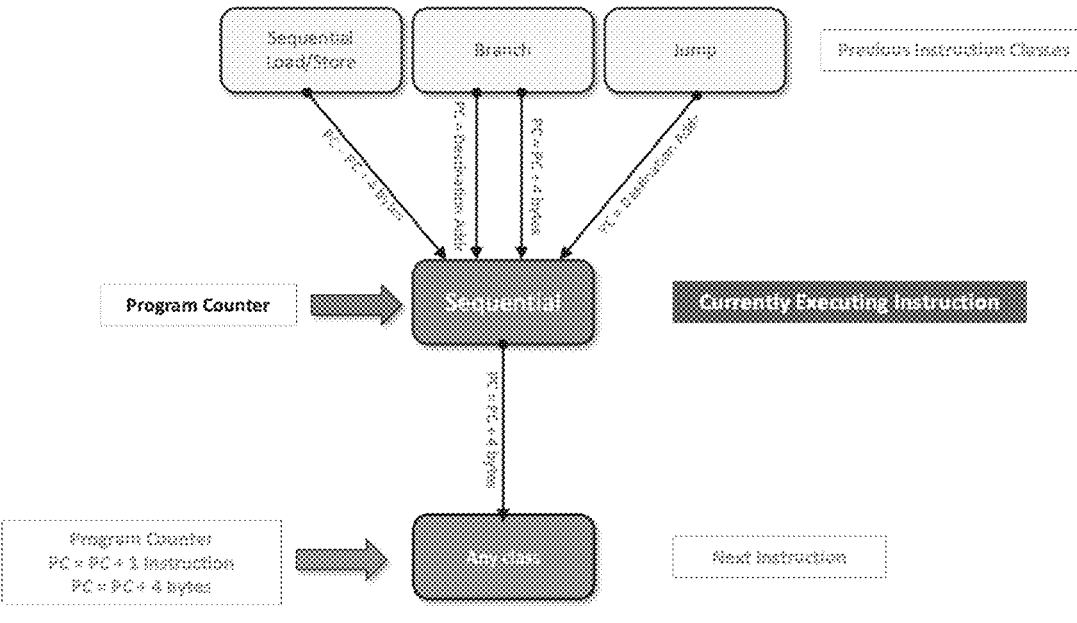
FIG. 6 illustrates one embodiment of sequential instruction class control flow links.

FIG. 6 illustrates one embodiment of sequential instruction class control flow links. There are 3 possible previous instruction classes, and one path to the next instruction which can be any instruction class. Sequential instructions are characterized by the next instruction is found by incrementing the program counter register (PCR) by 1 instruction. For RISC-V architecture, the next instruction is found at PCR:=PCR+4 bytes.

Figure 7:
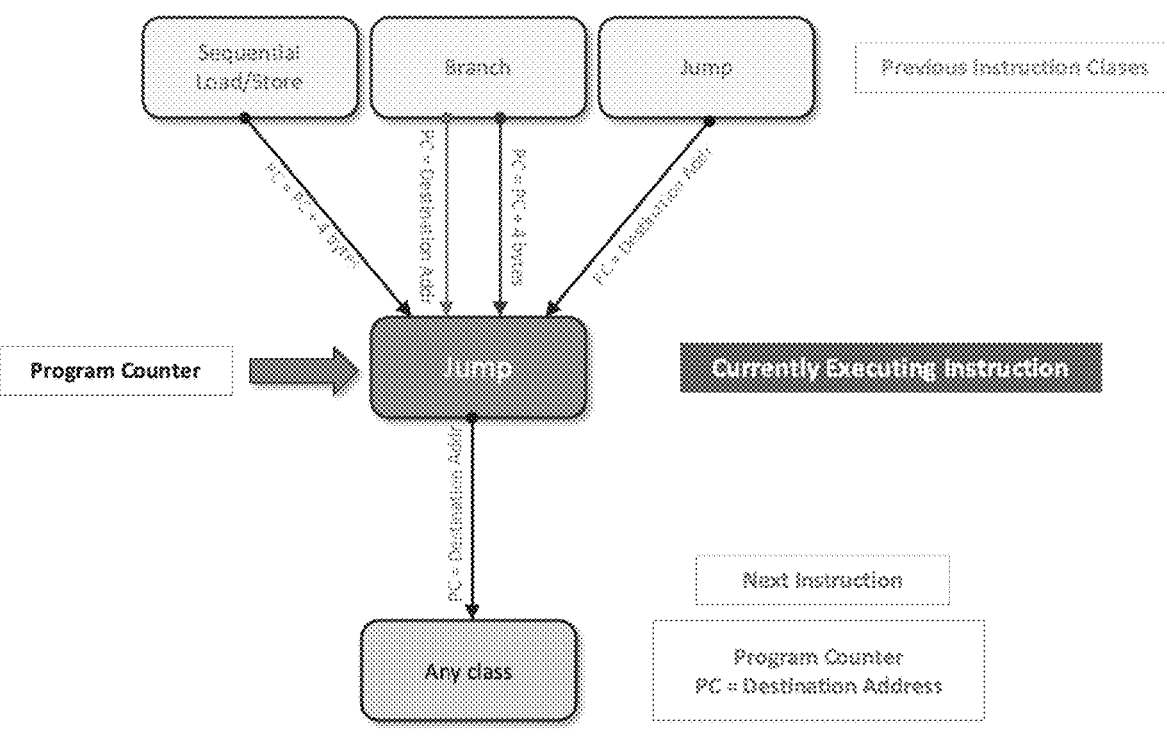
FIG. 7 illustrates one embodiment of jump class instruction control flow links.

FIG. 7 illustrates one embodiment of jump class instruction control flow links. There are 3 possible previous instruction classes, and one destination address for the next instruction which can be any instruction class. Jump class instruction is characterized by the next instruction is the destination address. For RISC-V architecture, the next instruction is found at PCR:=destination address in bytes.

Figure 8:
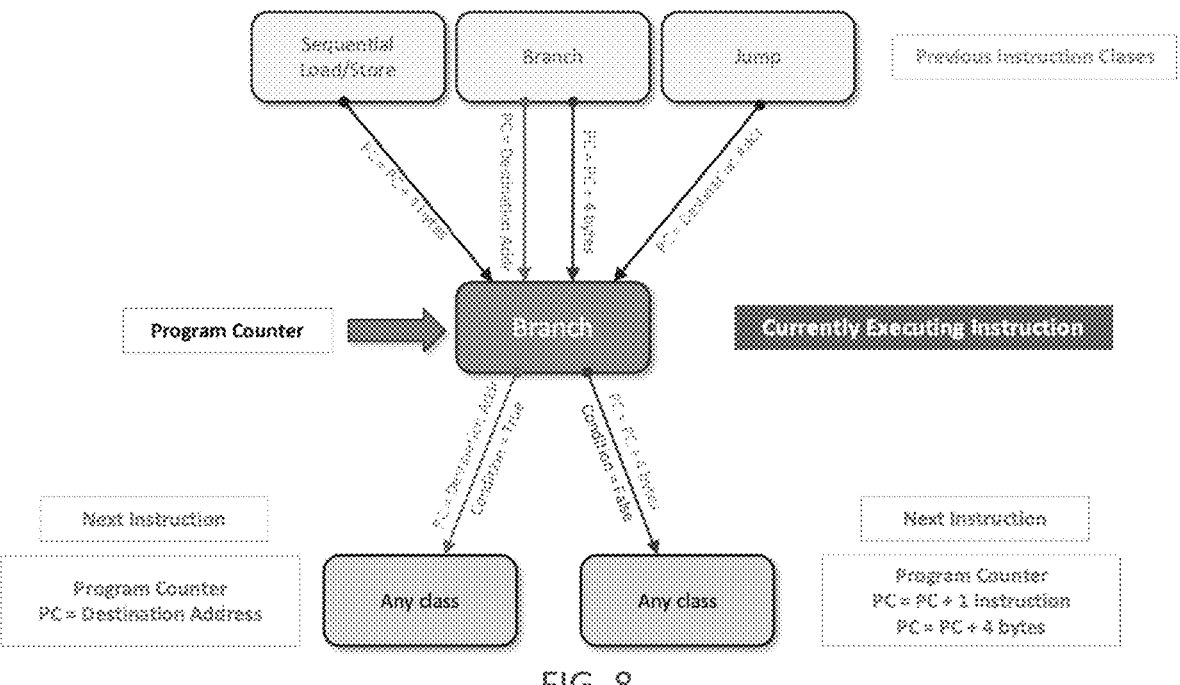
FIG. 8 illustrates one embodiment of conditional branch class instruction control flow links.

FIG. 8 illustrates one embodiment of conditional branch class instruction control flow links. There are 3 possible previous instruction classes, and two paths to the next instruction: if conditional branch is true, the next instruction is found at the destination address; else the next instruction is found at the next sequential address. For RISC-V architecture, the next instruction for conditional branch is true, is PCR:=destination address in bytes, or else at PCR:=PCR+4 bytes.

Figure 9:
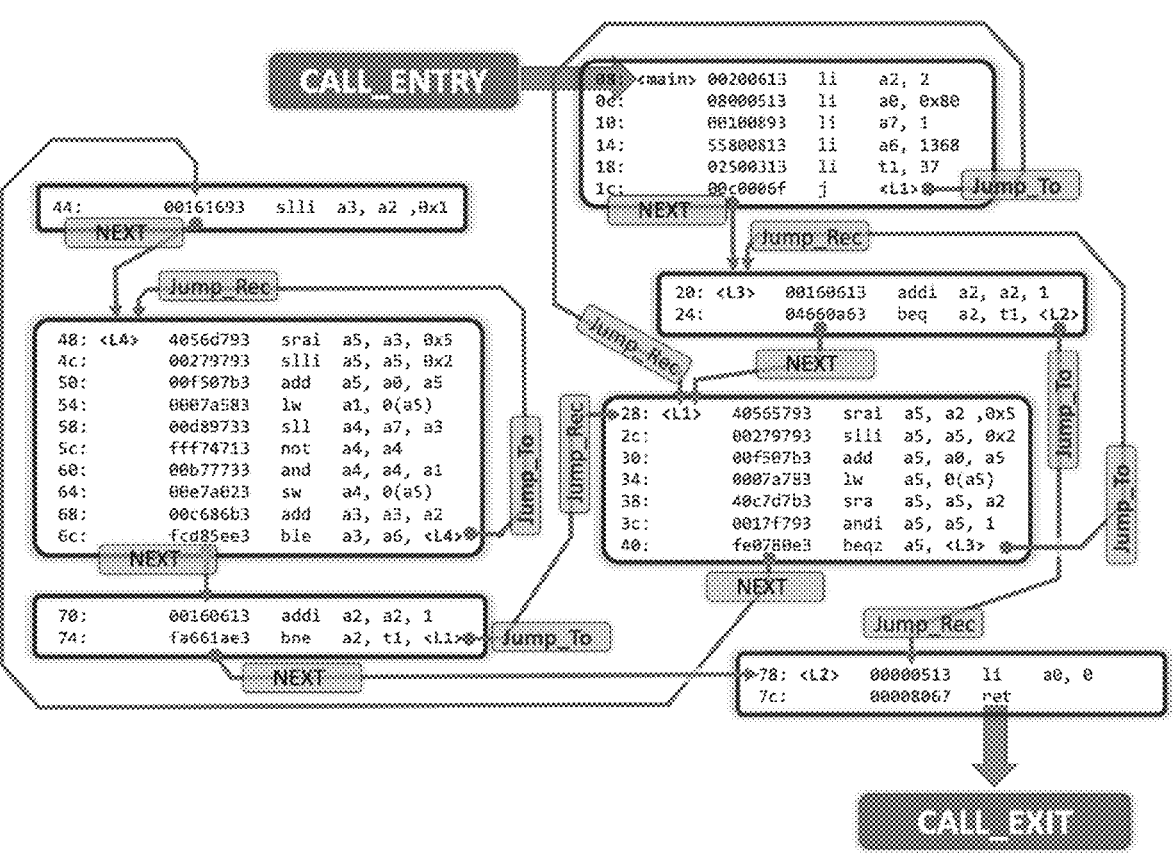
FIG. 9 illustrates an embodiment of control flow links, single entry and exit points, and code blocks.

FIG. 9 illustrates an embodiment of control flow links, single entry and exit points, and code blocks. Some example control flow link types are included. Inside the code blocks all instructions execute sequentially. The jump, conditional branch, and return from subroutine instructions define the links between code blocks.

Figure 10:
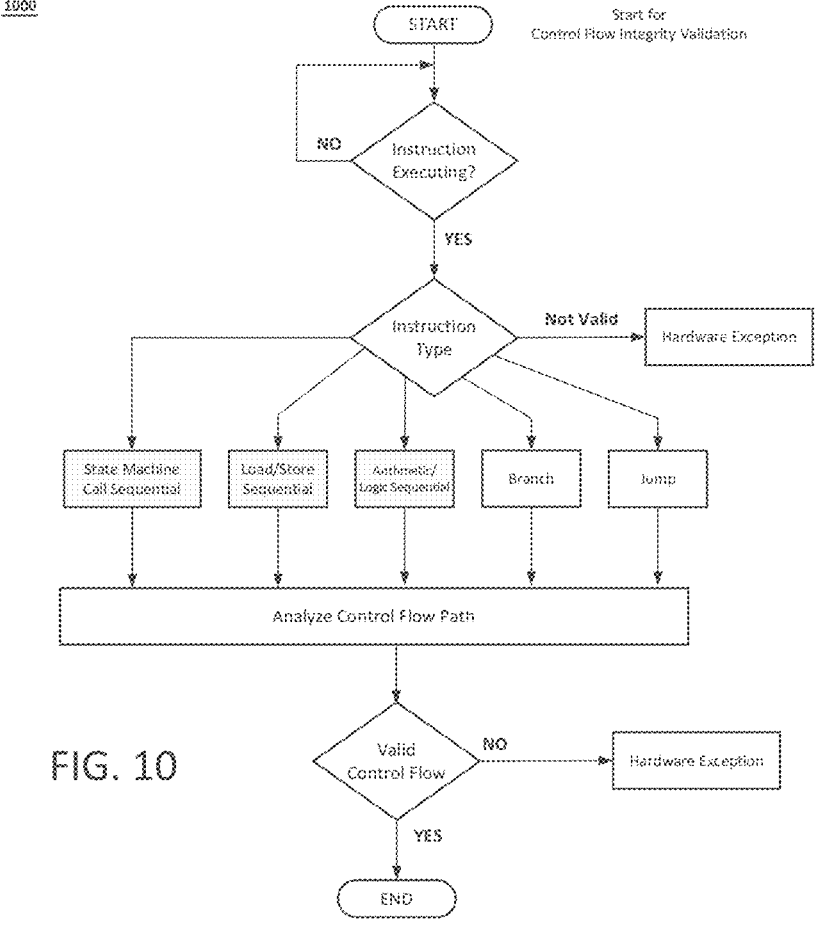
FIG. 10 shows an exemplar flow chart for control flow verification.

FIG. 10 shows an exemplar flow chart 1000 for control flow verification. Each instruction type has a set of allowed operations. Control flow state machine monitor checks the control flow path. If the path is not valid, an exception is raised.

Figure 11:
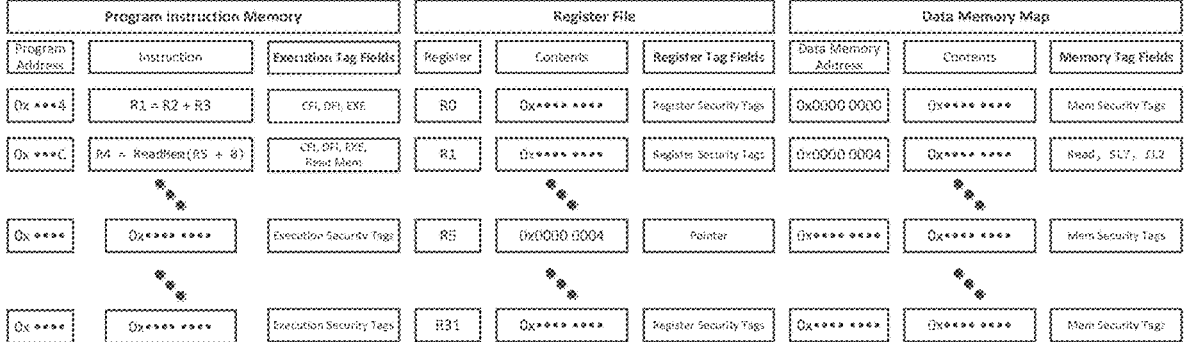
FIG. 11 presents an example architecture showing program instruction memory, register file, and data memory.

FIG. 11 presents an example architecture showing program instruction memory, register file, and data memory. All security tag fields are completely isolated from the instruction execution pipeline and all software (including any operating system). All tag fields are created by a trusted agent. Tag fields provide instruction execution, control flow, data flow, memory access flow, and register tracing for all state machine monitors.

Figure 12:
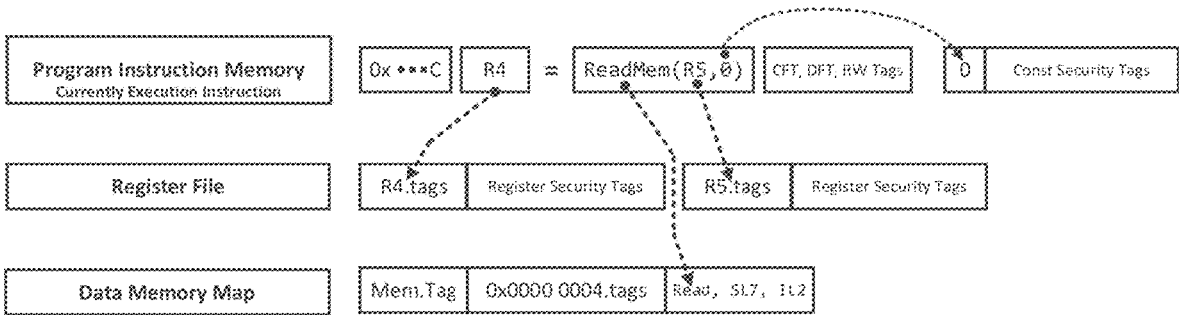
FIG. 12 presents an example instruction showing memory access information flow and data information flow.

FIG. 12 presents an example instruction showing memory access information flow and data information flow. The instruction R4=ReadMem(R5,0) reads the memory word pointed to by register R5+offset of 0. The offset 0 is a constant and has a constant security tag. Register R5 is a pointer and has security tag fields set to pointer. ReadMem (memory access information flow) assigns the tag fields of READ, SL7 (security level 7), and IL2 (integrity level 2) to register R4 tag fields, R4.tags. FIG. 12 illustrates how data integrity is tracked and transferred during instruction execution.

Figure 13:
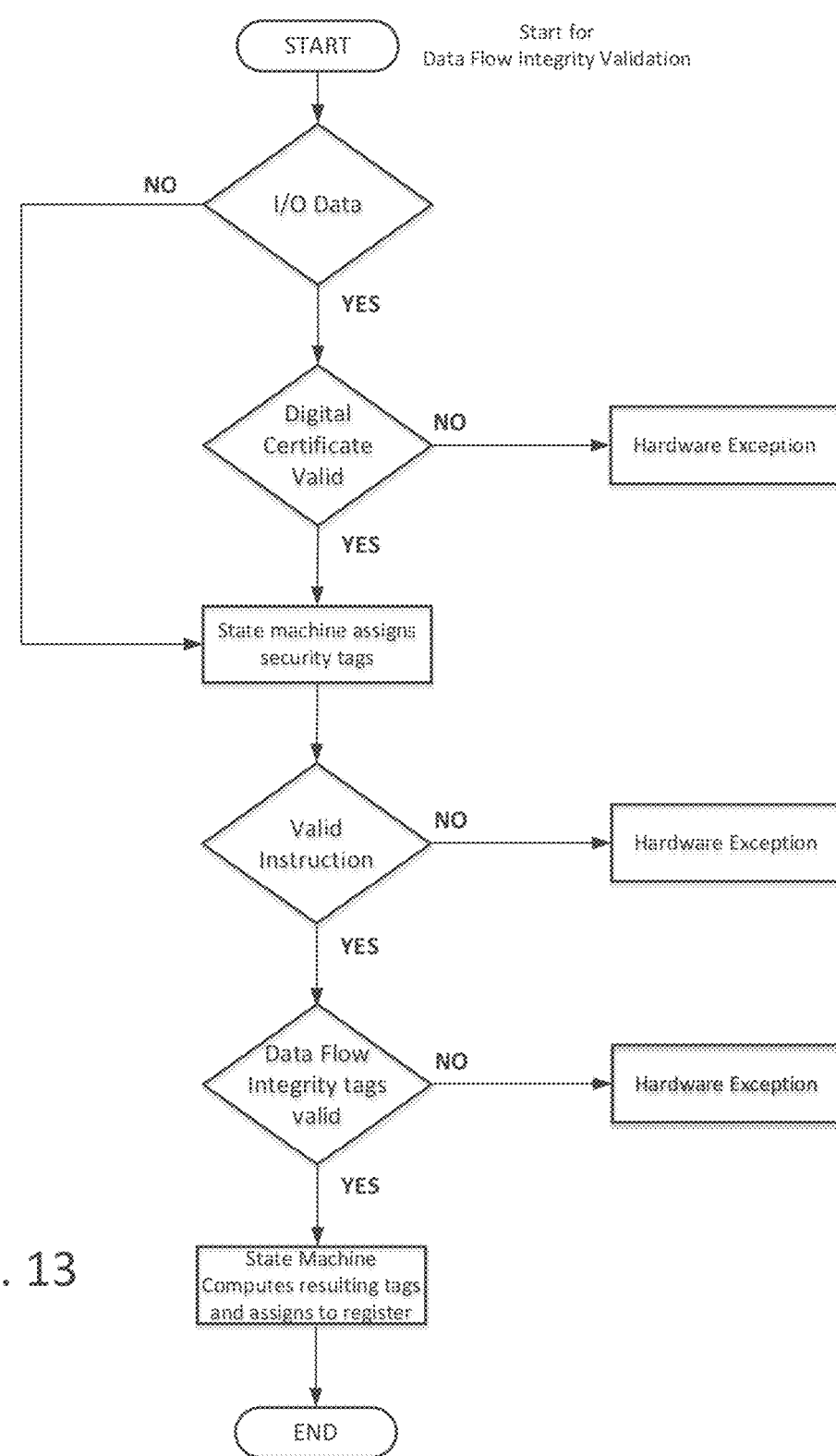
FIG. 13 presents a flow chart showing data flow integrity validation.

FIG. 13 presents a flow chart 1300 showing data flow integrity validation. If data is I/O Data type, the digital certificate must valid. Valid Instruction ensures the instruction is valid. Data flow integrity tags valid checks to ensure the data information flow is allowed. The State Machine(s) computes the resulting data flow tags and assign them to a register. END completes data flow integrity check for the completed instruction.

Figure 14:
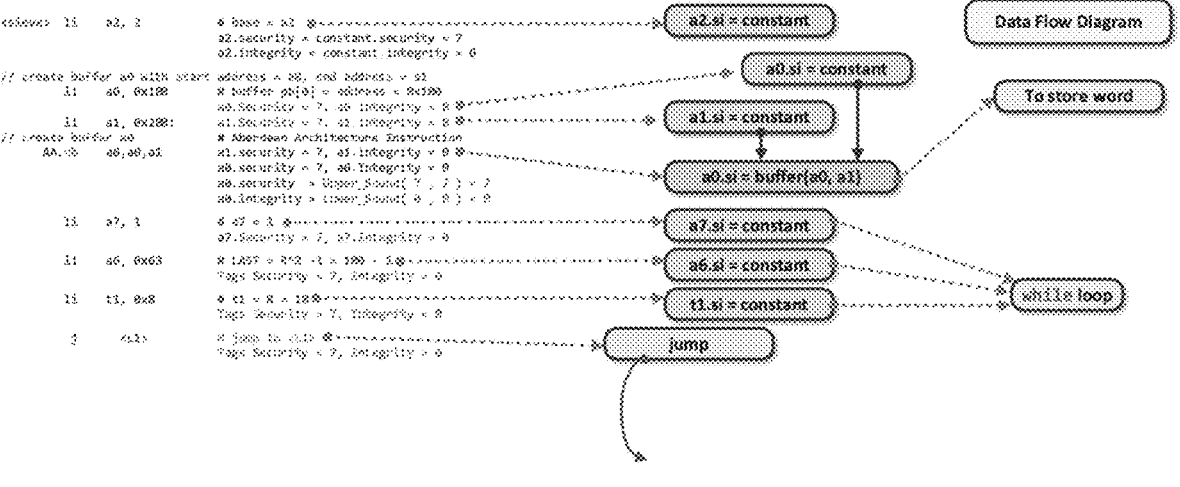
FIG. 14 presents an example data flow integrity tracking.

FIG. 14 presents an example data flow integrity tracking. Each instruction execution traces and transfers secrecy level and integrity level as the program is executing. A security level or integrity level violation results in an exception being raised.

Figure 15:
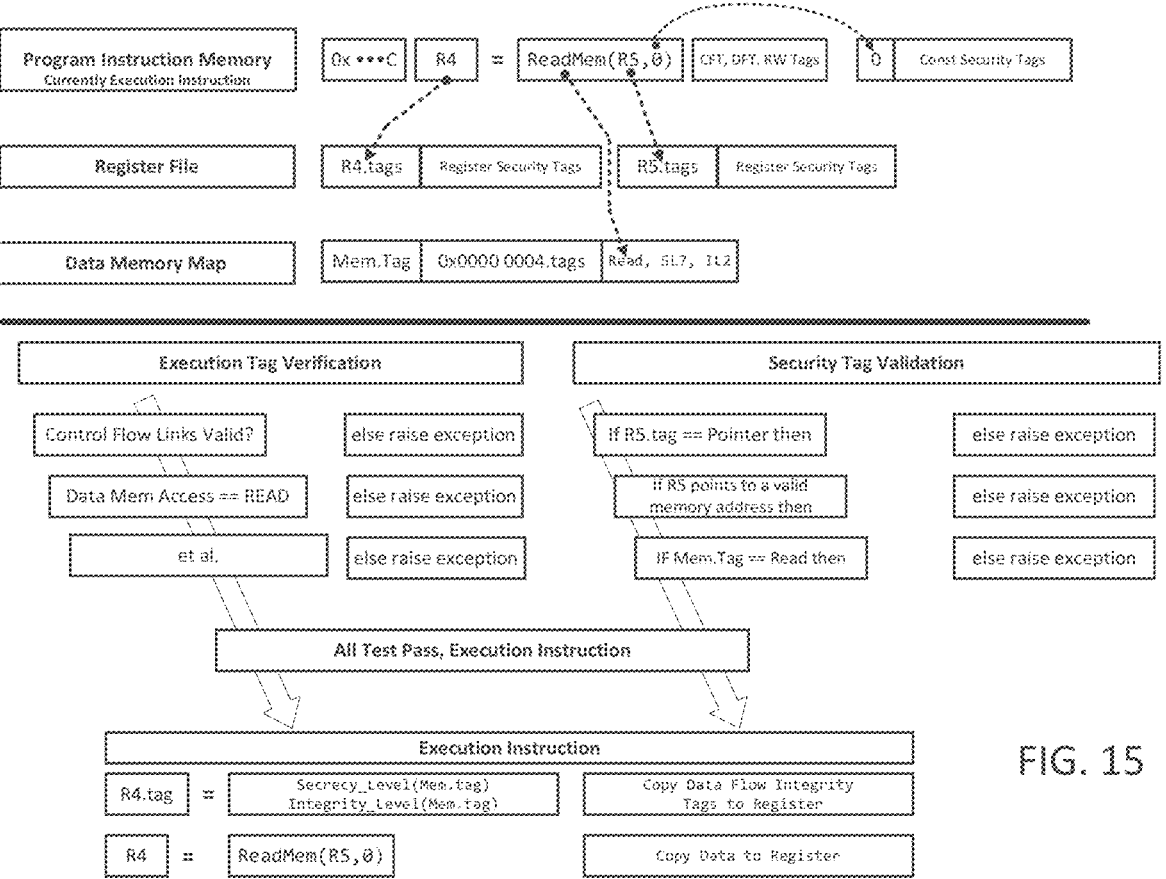
FIG. 15 presents an example information flow diagram for a load from memory instruction.

FIG. 15 presents an example information flow diagram for a load from memory instruction. FIG. 15 shows execution tag verification, security tag verification, data flow verification, and instruction execution verification.

FIG. 16 shows an example line of code illustrating security tag fields before and after execution in accordance with one or more embodiments of the invention. The figure covers control flow, memory access, control flow integrity links, data flow integrity links, register tags before and after execution.

Figure 17C:
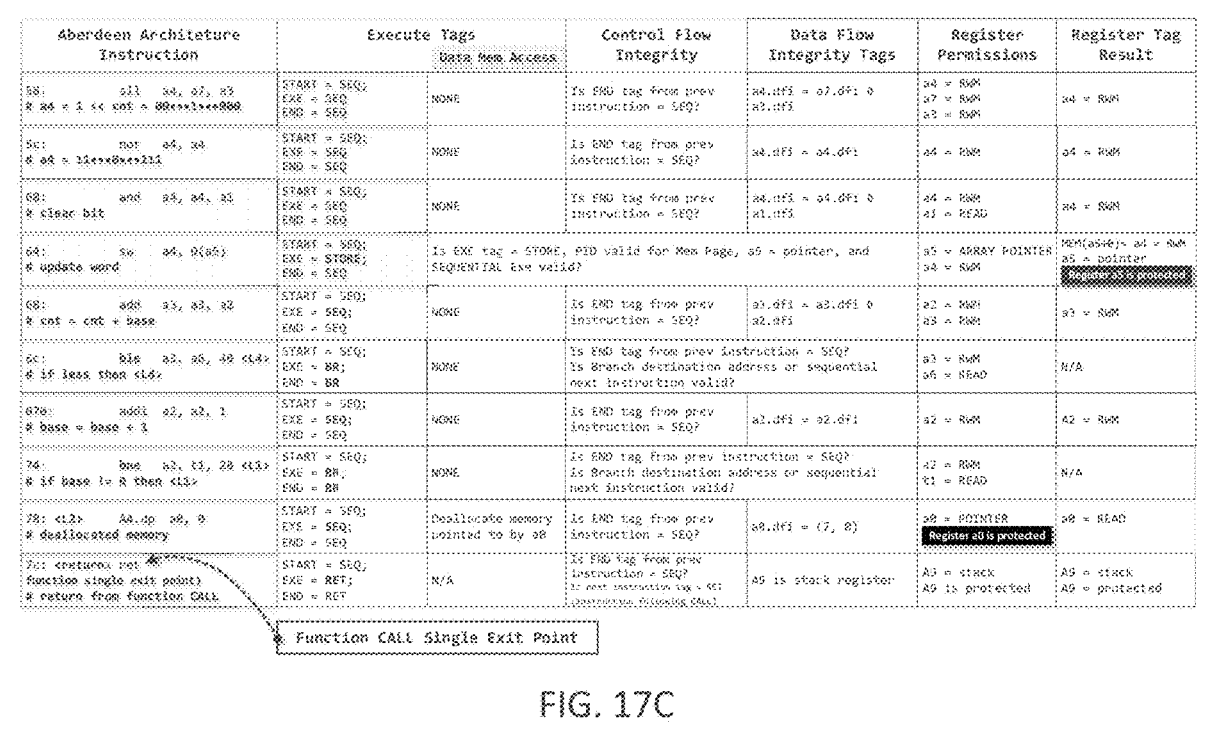

FIGS. 17A, 17B, and 17C show an example program running on a microprocessor operating in accordance with one or more embodiments of the invention. The figure illustrates example information flows in a microprocessor architecture using embodiments of the invention covering instruction flow, control flow, data flow, and memory access flow. The figures illustrate some possible combinations of code blocks, single entry and exit points, control flow, data flow, memory access, protected instructions, and register tag fields (before and after instruction execution).

Examples of Vulnerabilities Mediated by Various Embodiments of the Invention 1) Buffer Errors This vulnerability allows inappropriate read and/or write access to locations within memory associated with variables, data structures or internal program data. Inappropriate access to memory is exploited to subvert the normal hardware operations creating security vulnerability(ies) in the hardware.

TABLE 1

| RISC-V Instruction | Operation |
|---|---|
| LW rd, offset(rs1) | rd = mem_read(addr = rs1 + Offset) |

In one example of the operation of the state machine(s) on a RISC-V instruction, state machine(s) protect against inappropriate read and/or write access to locations within memory associated with variables, data structures or internal program data. An example, instruction and operation, is shown in Table 1. To provide complete mediation against information leaks when the forgoing instruction is executed (e.g., READ: LW R1,10(R2)), the state machines perform the operations shown in Table 2.

TABLE 2

| Complete Mediation for LW R1,10(R2) | |
|---|---|
| 0x00ABCD04<br>READ: LW R1,10(R2) | Is the address 0x00ABCD04 valid for the running process?<br>Is the memory page valid for the running process?<br>Is the memory page executable code?<br>Is the memory page Process ID valid? |
| 0x00ABCD04<br>READ: LW R1,10(R2)<br>LW<br>R2<br>R2 + offset | Are the control flow security tags valid?<br>Is LW tag set?<br>Is register R2 a valid pointer?<br>Is the memory page pointed to by R2 + offset valid?<br>Is the memory address pointed to by R2 + offset valid? |
| mem_addr = R2 + offset<br>R1<br>R1 | Do the security tags for mem_addr allow for read access by process?<br>Are the data flow integrity tags valid?<br>Do register tags allow from write access to R1? |
| If all mediation tests pass, then → | R1 = READ(mem_addr = R2 + offset) |

2) Permission, Privileges and Access Control

This vulnerability allows execution of unauthorized operations in a system. A privilege vulnerability can allow inappropriate access to system privileges. A permission vulnerability can allow inappropriate permission to perform functions. An access vulnerability can allow inappropriate control of the authorizing policies for the hardware.

Using the architecture described above, all resources are by default not allowed. All privileged operations are handled by the hardware state machines. For privilege escalation to occur, the state machine monitors would need to be directly subverted.

3) Resource Management

This vulnerability allows improper use of the hardware resources that in turn allow external takeover of hardware resources. This includes improper access to hardware resources such as memory, CPU, and communication and/or preventing valid users from gaining access to these resources.

All requests for resources are managed by state machine monitors. The state machine monitors are completely isolated from the execution pipeline. Software has no access to the state machine monitors. In current systems, resource side channels may leak information; however, embodiments of the present invention isolate all resources to eliminate information leaks. For example, branch predictors have a coefficient table for each process. A rogue process cannot modulate the branch predictor to steal information from another process. Caches are isolated based on process identification. A rogue process cannot modulate a cache bank or line to leak (steal) information from another process.

4) Code Injection

This vulnerability allows inappropriate code to be injected into the hardware due to an inherent vulnerability in the hardware. This vulnerability allows introduction of malicious code to change the course of execution on the hardware.

It is assumed the attacker has already succeeded in loading the attack 'executable' payload and the executable is running. Complete mediation of instruction execution prevents malicious code from performing any illegal operations. Since the malicious code payload does not conform to the installed program's control flow graph and data flow graphs, the state machines will generate exceptions. A control flow violation would occur when the malicious program diverges from the control flow graph and generate an exception. In addition, a hardware exception would occur if an illegal instruction operation was attempted.

5) Information Leakage

This vulnerability allows inappropriate access to privileged information in the hardware through intentional or unintentional information sharing. This vulnerability includes inappropriate data transfers, caching mechanisms, and error handling but are not limited to these areas.

The combination of complete mediation for instruction execution and time-space isolation prevents processes from being correlated. Shared resources are completely space and time isolated.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, in parallel or serial, including substantially simultaneously, i.e. within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g. one or more of A, B, and/or C), unless stated otherwise, it is understood to include one or more of each element, including any one or more combinations of any number of the enumerated elements (e.g. A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A computing device comprising:
an execution pipeline comprising at least one information flow;
wherein the at least one information flow is tagged with at least one tag field which may include one or more subfields to track and monitor information flows,
wherein security rules are encoded in said at least one tag field,
a register and memory architecture with at least one level tag field which may include one or more subfields and at least one tag field to track and monitor instruction and memory operations in real-time,
at least one state machine-based operating system adapted to read tag fields and apply security rules to content of the at least one information flow in real time,
an execution pipeline virtualized by the at least one information flow,
at least one state machine-based operating system kernel and at least one tag field which may include one or more subfields, and
a real-time, hardware level exception mechanism to block any illegal operation before the operation modifies any system state.

2. The computing device of claim 1 wherein the at least one state machine is located at security level 0.

3. The computing device of claim 1 wherein the at least one state machine performs at least one, or any combination, of the following functions: an instruction execution monitor (IEM), a memory page monitor (MPM), a control flow monitor (CFM), a data flow monitor (DFM), an exception monitor (EM), a stack monitor (SM), or an interrupt monitor (IM).

4. The computing device of claim 1 wherein the computing device is a microprocessor.

5. The computing device of claim 1 wherein a violation of a security rule causes a hardware exception.

6. The computing device of claim 1 wherein the at least one state machine is formed in hardware.

7. The computing device of claim 1 wherein the at least one information flow comprises at least one of: an instruction flow, a control flow, a memory access flow, a data flow or any combination thereof.

8. The computing device of claim 1 wherein, upon the occurrence of a rule violation, a mediation action will be taken by the computing device.

9. The computing device of claim 8 wherein the mediation action taken depends upon a severity level of the rule violation.

10. A method of providing security for a computing device, where the computing device comprises a completely virtualized execution pipeline having at least one information flow having content, at least one tag field to track and monitor system security state, a register and memory tag field architecture to track and monitor instruction execution in real time, an operating system to monitor instruction execution in real-time and apply at least one tag field and at least one security rule to the content of the at least one information flow and at least one hardware level state machine operating system kernel adapted to monitor the execution pipeline, the method comprising:

Applying and using the state machine to the content of the at least one information flow;

generating a real-time rule violation notification upon the content violating a security rule, and blocking any action that would cause an illegal change in the system state in-real time.

11. The method of claim 10 wherein the at least one state machine is located at security level 0.

12. The method of claim 10 further comprising performing at least one, or any combination, of the following functions: an instruction execution monitor (IEM), a memory page monitor (MPM), a control flow monitor (CFM), a data flow monitor (DFM), an exception monitor (EM), a stack monitor (SM), or an interrupt monitor (IM).

13. The method of claim 10 wherein a violation of a security rule causes a hardware exception.

14. The method of claim 10 wherein the at least one state machine is formed in hardware.

15. The method of claim 10 wherein the at least one information flow comprises at least one of: an instruction flow, a control flow, a memory access flow, a data flow or any combination thereof.

16. The method of claim 10 further comprising, upon the occurrence of a rule violation, taking a mediation action.

17. The method of claim 16 wherein the mediation action taken depends upon a severity level of the rule violation.

18. A microprocessor comprising:

an execution pipeline comprising at least one information flow including at least one of an instruction flow, a control flow, a memory access flow, a data flow or any combination thereof;

at least one hardware state machine located at security level 0 and adapted to apply security rules to content of the at least one information flow, and, upon an occurrence of a security rule violation, generating a hardware exception in real-time, wherein hardware exceptions can range from a single exception to a plurality of exceptions, wherein detecting a single exception allows a second attempt at executing a portion of code where an error occurred, and wherein detecting a plurality of exceptions halts execution of the code where errors occurred.

19. The computing device of claim 18 wherein the at least one hardware state machine performs at least one, or any combination, of the following functions: an instruction execution monitor (IEM), a memory page monitor (MPM), a control flow monitor (CFM), a data flow monitor (DFM), an exception monitor (EM), a stack monitor (SM), or an interrupt monitor (IM) that provide virtualization of the execution pipeline.

20. The computing device of claim 18 wherein, in respond to the hardware exception, a mediation action will be taken by the microprocessor and the mediation action taken depends upon a severity level of the rule violation.

* * * * *